US008359916B2

(12) United States Patent
Karikomi et al.

(10) Patent No.: US 8,359,916 B2
(45) Date of Patent: Jan. 29, 2013

(54) METHOD OF WIND TUNNEL MEASUREMENT OF AIRFOIL

(75) Inventors: Kai Karikomi, Tokyo (JP); Yosuke Nakamura, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 232 days.

(21) Appl. No.: 12/963,978

(22) Filed: Dec. 9, 2010

(65) Prior Publication Data

US 2011/0138901 A1 Jun. 16, 2011

(30) Foreign Application Priority Data

Dec. 10, 2009 (JP) ................................ 2009-280679

(51) Int. Cl.
*G01M 9/00* (2006.01)
(52) U.S. Cl. .......................................................... 73/147
(58) Field of Classification Search ..................... None
See application file for complete search history.

(56) References Cited

U.S. PATENT DOCUMENTS

| | | | |
|---|---|---|---|
| 4,372,159 A | | 2/1983 | Doggett, Jr. et al. |
| 4,475,385 A | | 10/1984 | Farmer |
| 4,688,422 A | * | 8/1987 | Wood ............................... 73/147 |
| 4,727,751 A | * | 3/1988 | Holmes et al. .................... 73/147 |
| 4,782,319 A | * | 11/1988 | Dell'Acqua et al. ............... 338/4 |
| 5,056,361 A | * | 10/1991 | Roberts ............................ 73/147 |
| 5,209,111 A | * | 5/1993 | Agarwal et al. .................. 73/147 |
| 5,341,677 A | * | 8/1994 | Maris ............................... 73/147 |
| 6,553,823 B2 | * | 4/2003 | Omotani et al. ................. 73/147 |
| 6,662,647 B2 | * | 12/2003 | Schoess et al. ............... 73/170.02 |
| 6,752,020 B1 | * | 6/2004 | Sobotta et al. ................... 73/702 |
| 6,826,493 B1 | * | 11/2004 | Mangalam ....................... 702/45 |
| 7,082,388 B2 | * | 7/2006 | Omotani ............................ 703/8 |

FOREIGN PATENT DOCUMENTS

| | | |
|---|---|---|
| EP | 0813049 A1 | 12/1997 |
| JP | 7027665 A | 1/1995 |
| JP | 09-210839 A | 8/1997 |

OTHER PUBLICATIONS

European Search Report for Application No. 10194358.7-1236, issued Mar. 31, 2011.

\* cited by examiner

*Primary Examiner* — Lisa Caputo
*Assistant Examiner* — Jermaine Jenkins
(74) *Attorney, Agent, or Firm* — Kanesaka Berner & Partners Patent Agents, LLP

(57) ABSTRACT

A method of wind tunnel measurement of airfoil, includes a step of providing a wind tunnel test apparatus. The wind tunnel test apparatus includes two walls, two supporting members, and two load measuring units. The method further includes steps of: coupling both ends of an airfoil model under test with the two supporting members, respectively; generating a flow of a fluid in the wind tunnel flow path; and measuring a load applied to the airfoil model by using the two load measuring units. A thin film member is stuck on each end of the airfoil model so that a part of the thin film member protrudes from the each end of the airfoil model along an outer circumference throughout an entire circumference. The thin film member has a strength at which the thin film member enables to endure a pressure of the fluid, and is formed of a material which is elastically deformable. The thin film member is provided so that a gap between the each end of the airfoil model and one of the two walls facing to the each end of the airfoil model is blocked.

6 Claims, 4 Drawing Sheets

Fig. 1
Fig. 2
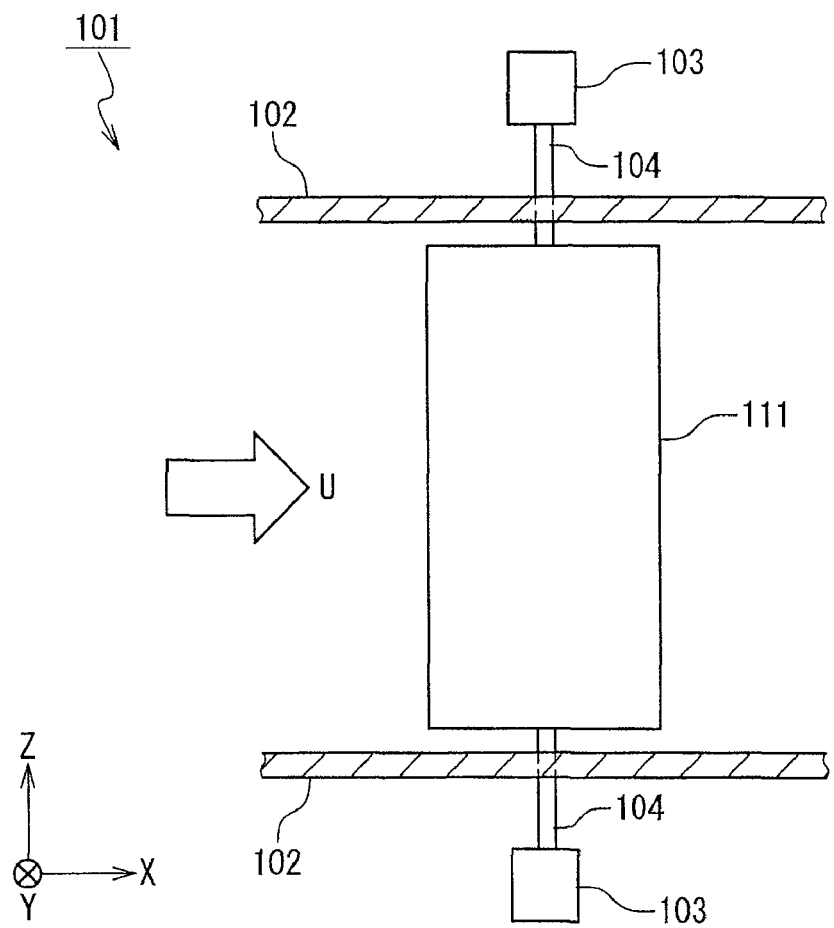
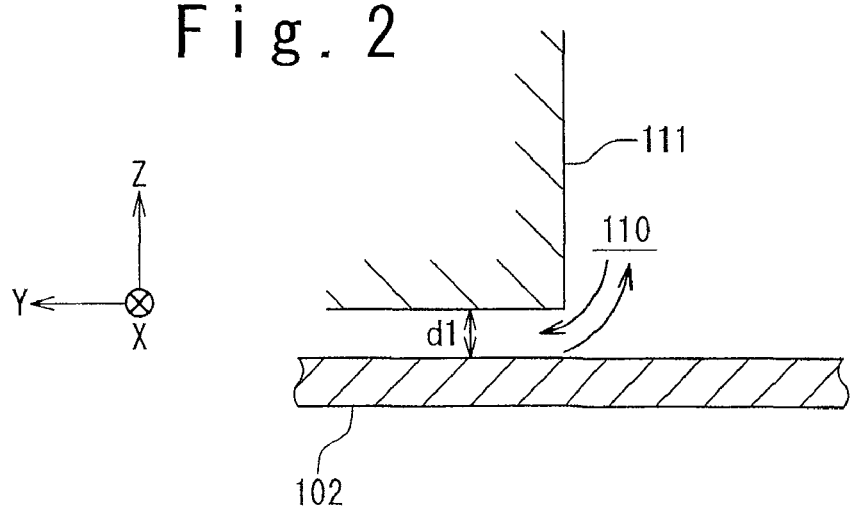

METHOD OF WIND TUNNEL MEASUREMENT OF AIRFOIL

INCORPORATION BY REFERENCE

This application is based upon and claims the benefit of priority from Japanese patent application No. 2009-280679 filed on Dec. 10, 2009, the disclosure of which is incorporated herein in its entirety by reference.

BACKGROUND OF THE INVENTION

1. Field of the Invention

The present invention relates to a method of wind tunnel measurement of airfoil, and more particularly relates to a method of wind tunnel measurement of airfoil, which is used for in a windmill, an aircraft, a turbine and the like.

2. Description of Related Art

As an apparatus that uses a blade, a windmill, an aircraft, a turbine and the like are known. The blade of the windmill, the aircraft or the like is high in aspect ratio (fineness ratio) (e.g., 10 to 20 or more). For this reason, in many cases, the aerodynamic design and the calculation of the aerodynamic performance of the entire blade are carried out by determining the aerodynamic performance of a two-dimensional airfoil section and integrating it in a blade width direction and then estimating a three-dimensional performance. In that case, it is necessary to carry out a wind tunnel test under a condition close to an actual use condition to get the aerodynamic characteristics of the two-dimensional airfoil section.

One of the conditions for the wind tunnel test is to secure the two-dimensional flow property. The flow of the fluid in the actual entire blade is three-dimensional. However, as mentioned above, the aspect ratio of the actual blade is high. Thus, from the viewpoint of each blade element, the flow of the fluid can be considered to be two-dimensional except the blade ends. Hence, in the wind tunnel test, it is important to remove the three-dimensional flow property of the fluid and secure its two-dimensional flow property.

As a related technique, Japanese Patent Publication No. JP-A-Heisei 9-210839 discloses a wind tunnel test apparatus for a structure. This wind tunnel test apparatus for a structure includes: a wind guiding path through which air flows; a model which is arranged in the wind guiding path and has an axis serving as a rotation center; a suspending wire suspending and holding the model in the wind guiding path; a detector which detects various forces generated in the model through the suspending wire when the model receives the flow of air; a model rotating mechanism which has a motor and a decelerator interlocking with the motor and rotates the model around the axis to change an orientation of the model with respect to a direction of the flow of air; and an actuator which is remotely operated. This wind tunnel test apparatus is characterized by containing a fixing mechanism for fixing the model in an orientation determined by the model rotating mechanism.

The inventors have now discovered the following facts.

The inventors have studied the following method as a method of a wind tunnel test. FIG. 1 is a schematic view showing the method of the wind tunnel test studied by the inventors. As shown in FIG. 1, a wind tunnel test apparatus 101 includes two walls 102, two supporting members 104 and two load cells 103. Each of the two walls 102 has a flat surface parallel to an x-direction. The two walls 102 are arranged at a predetermined distance from each other in a z-direction. The space between the walls 102 configures a wind tunnel flow path. An airfoil (airfoil model 111) under test is arranged in the wind tunnel flow path. A fluid (air)) for the wind tunnel test flows through the wind tunnel flow path. The upper supporting member 104 is arranged to penetrate through the upper wall 102 in the z-direction and not to interfere with the upper wall 102. The lower supporting member 104 is arranged to penetrate through the lower wall 102 in the z-direction and not to interfere with the lower wall 102. In the upper supporting member 104, one end is coupled with the top end of the airfoil model 111, and the other end is coupled with the upper load cell 103. In the lower supporter 104, one end is coupled with the bottom end of the airfoil model 111, and the other end is coupled with the lower load cell 103. The two load cells 103 fix the airfoil model 111 in the z-direction through the supporting members 104, respectively. The load cells 103 measure loads in the x-direction and the y-direction that are applied to the airfoil model 111 at the time of the wind tunnel test. The airfoil model 111 has the shape in which the airfoil is cut away in the two flat surfaces vertical to the longitudinal direction of the airfoil. The two supporting members 104 are connected to both ends of the airfoil model 111 that correspond to the two cutaway surfaces, respectively.

In this way, when the airfoil model 111 is placed inside the wind tunnel flow path and then the load is measured by using the load cells 103, a pair of balances or the like, it is considered that the following case occurs. That is, the airfoil model 111 is moved in the z-direction, then the airfoil model 111 is brought into contact with the surface of the wall 102, and consequently the load in the airfoil model 111 cannot be properly measured. Thus, in order to avoid the influence on the z-direction displacement of the airfoil model 111, it is required to form a gap between the airfoil model 111 and each of the two walls 102. FIG. 2 is a schematic view showing a relation between the airfoil model 111 and the wall 102. As shown in FIG. 2, a gap with an interval d1 is formed between the airfoil model 111 and the wall 102. For example, in the case of the airfoil model 111 having an airfoil chord length of 1500 mm, the interval d1 is approximately 10 mm.

However, with the existence of this gap, there is a possibility that a gap flow 110 occurs and/or an airfoil tip vortex (not shown) increases. Here, the gap flow 110 is the flow that the fluid moves from the side of a positive pressure surface to the side of a negative pressure surface in the airfoil model 111. In that case, the flow of the fluid is not two-dimensional originally scheduled but three-dimensional. This results in the loss of the lifting power of the airfoil model 111. Thus, it is difficult to obtain the aerodynamic characteristics of the two-dimensional airfoil section that is originally purposed.

SUMMARY

Therefore, an object of the present invention is to provide a method of wind tunnel measurement of airfoil, which can measure aerodynamic characteristics of a two-dimensional airfoil section more accurately. Also, another object of the present invention is to provide a method of wind tunnel measurement of airfoil, which can make the flow of the fluid more two-dimensional.

In order to achieve an aspect of the present invention, the present invention provides a method of wind tunnel measurement of airfoil, including: providing a wind tunnel test apparatus, the wind tunnel test apparatus including: two walls configuring a wind tunnel flow path therebetween, two supporting members arranged to penetrate through the two walls, respectively, and not to interfere with the two walls, and two load measuring units holding the two supporting members, respectively; coupling both ends of a airfoil model under test with the two supporting members, respectively; generating a flow of a fluid in the wind tunnel flow path; and measuring a load applied to the airfoil model by using the two load measuring units. A thin film member is stuck on each end of the airfoil model so that a part of the thin film member protrudes from the each end of the airfoil model along an outer circumference throughout an entire circumference. The thin film member has a strength at which the thin film member enables to endure a pressure of the fluid, and is formed of a material which is elastically deformable. The thin film member is provided so that a gap between the each end of the airfoil model and one of the two walls facing to the each end of the airfoil model is blocked.

According to the present invention, it is possible to provide a method of wind tunnel measurement of airfoil, which can measure aerodynamic characteristics of a two-dimensional airfoil section more accurately. Also, according to the present invention, it is possible to provide a method of wind tunnel measurement of airfoil, which can make the flow of the fluid more two-dimensional.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 1 is a schematic view showing a wind tunnel test apparatus studied by the inventor;

FIG. 2 is a schematic view showing a relation between an airfoil model and a wall;

DESCRIPTION OF THE PREFERRED EMBODIMENTS

An embodiment of a method of wind tunnel measurement of airfoil according to the present invention will be described below with reference to the attached drawings.

Figure 3:
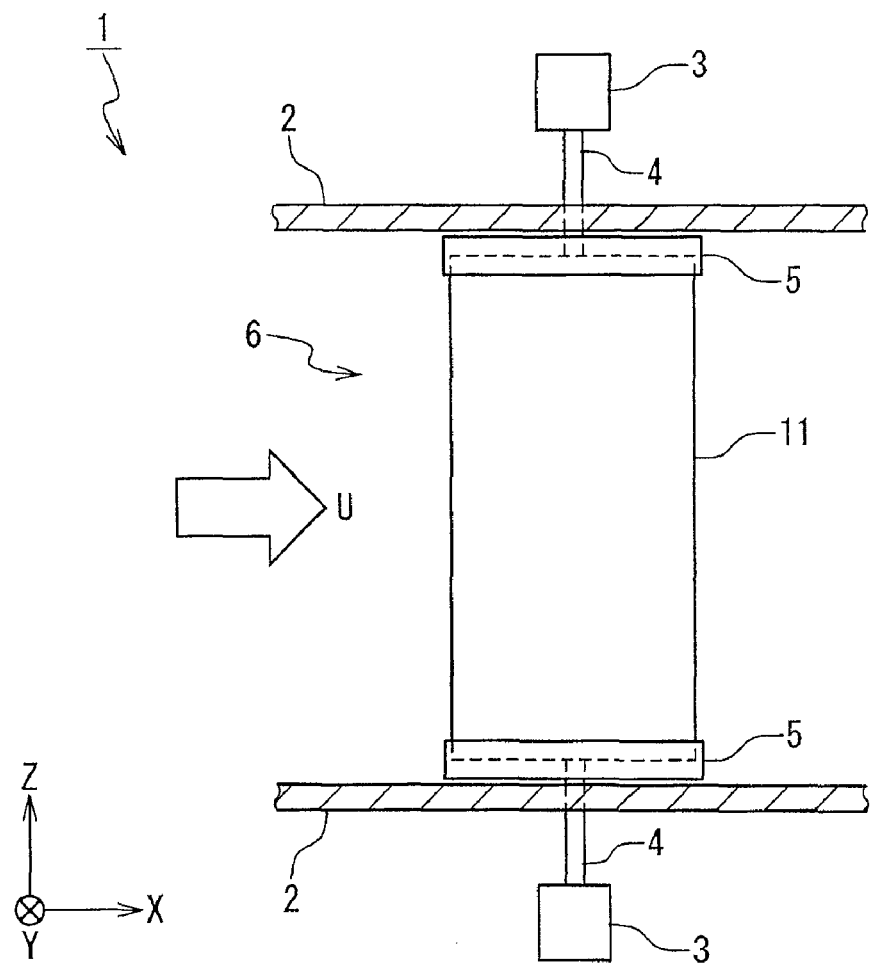
FIG. 3 is a schematic view showing a method of wind tunnel measurement of airfoil according to an embodiment of the present invention.

At first, an airfoil wind tunnel measurement apparatus according to the embodiment of the present invention will be described. FIG. 3 is a schematic view showing an airfoil wind tunnel measurement apparatus according to the embodiment of the present invention. As shown in FIG. 3, a wind tunnel test apparatus 1 includes two walls 2, two supporting members 4 and two load cells 3. Each of the two walls 2 has a flat surface parallel to an x-direction. The two walls 2 are arranged at a predetermined distance from each other in a z-direction. The space between the walls 2 configures a wind tunnel flow path 6. An airfoil (airfoil model 11) under test is arranged in the wind tunnel flow path 6. A fluid (air) for the wind tunnel test flows through the wind tunnel flow path 6. The upper supporting member 4 is arranged to penetrate through the upper wall 2 in the z-direction and not to interfere with the upper wall 2. The lower supporting member 4 is arranged to penetrate through the lower wall 2 in the z-direction and not to interfere with the lower wall 2. In the upper supporting member 4, one end is coupled with the top end of the airfoil model 11, and the other end is coupled with the upper load cell 3. In the lower supporting member 4, one end is coupled with the bottom end of the airfoil model 11, and the other end is coupled with the lower load cell 3. The two load cells 3 fix the airfoil model 11 in the z-direction through the supporting members 4, respectively. The load cells 3 measure loads in the x-direction and the y-direction that are applied to the airfoil model 11 at the time of the wind tunnel test. However, a different device may be used if the loads in the x-direction and the y-direction can be measured. The airfoil model 11 has the shape in which the airfoil is cut away in two flat surfaces vertical to the longitudinal direction of the airfoil, or has the shape similar thereto. The two supporting members 4 are connected to both ends of the airfoil model 11 that correspond to the two cutaway surfaces, respectively.

Figure 4:
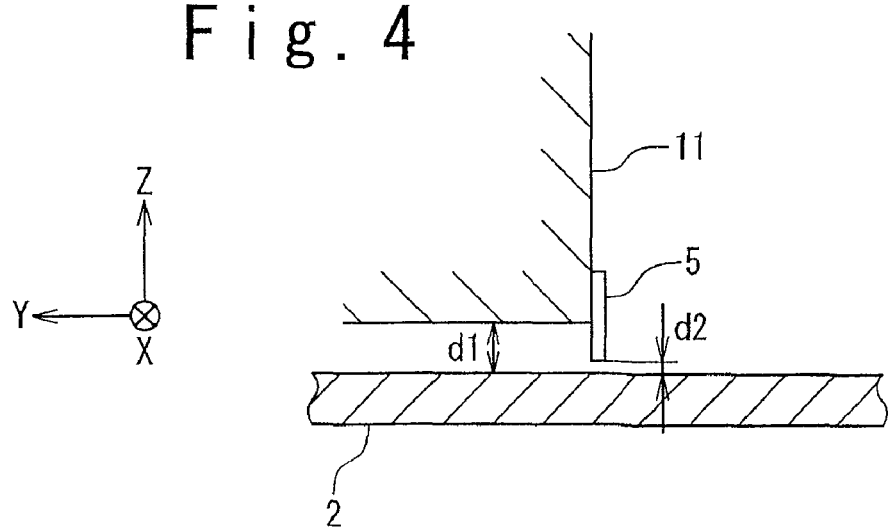
FIG. 4 is a schematic view showing a relation between an airfoil model and a wall.

FIG. 4 is a schematic view showing a relation between the airfoil model 11 and the wall 2. As mentioned above, when the airfoil model 11 is placed inside the wind tunnel flow path 6 and then the load is measured by using the load cells 3, the pair of balances or the like, it is considered that the following case occurs. That is, the airfoil model 11 is moved in the z-direction, then the balance model 11 is brought into contact with the surface of the wall 2, and consequently the load in the airfoil model 11 cannot be properly measured. Thus, in order to avoid the influence on the z-direction displacement of the airfoil model 11, as shown in FIG. 4, a gap with an interval d1 is formed between the airfoil model 11 and the wall 2. For example, in the case of the airfoil model 11 having an airfoil chord length of 1500 mm, the interval d1 is approximately 10 mm. At this time, on each of both ends of the airfoil model 11, a thin film member 5 is arranged so that the gap between the airfoil model 11 and the wall 2 is blocked to avoid the above gap flow (the gap flow 110 in FIG. 2). It is preferred that a distance d2 between the wall 2 and the lower end of the thin film member 5 is as small as possible. It is further preferred that the distance d2 is substantially zero. Hence, a function for preventing the above gap flow (the gap flow 110 in FIG. 2) from being generated and the like can be exerted more surely.

Figure 5:
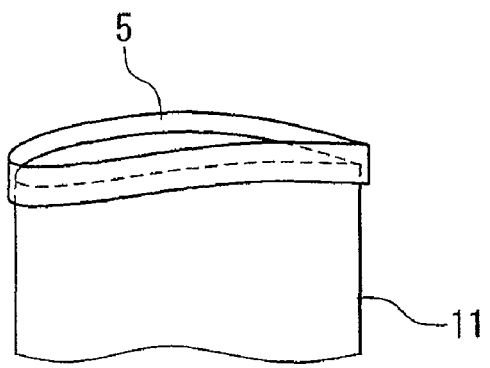
FIG. 5 is a schematic view showing a relation between an airfoil model and a thin film member.

FIG. 5 is a schematic view showing a relation between the airfoil model 11 and the thin film member 5. The thin film member 5 is the member having the shape of a thin film. The thin film member 5 is attached along an outer circumference of the end of the airfoil model 11 so that a part of the thin film member 5 protrudes from the end of the airfoil model 11 in the z-direction throughout the entire circumference (a circuit of the circumference). The thin film member 5 has a function for preventing: the generation of the gap flow (the gap flow 110 in FIG. 2) in which the fluid moves from the side of a positive pressure surface to the side of a negative pressure surface in the airfoil model 11; and the increase in the airfoil tip vortex, at the time of the airfoil wind tunnel measurement. In the thin film member 5 adhering (or stuck) to the end of the airfoil model 11, the width that protrudes in the z-direction from the end of the airfoil model 11 is preferred to be the same width throughout one circumference. Consequently, the function for preventing the generation of the above gap flow and the like can be exerted more surely.

The thin film member 5 has a strength at which the thin film member 5 can endure the pressure (wind pressure) of the fluid (air) for the wind tunnel test. That is, it is not substantially deformed under that pressure of the fluid. Also, the thin film member 5 does not limit the motion of the airfoil model 11 even if the thin film member 5 is brought into contact with one of the two walls. That is, since the thin film member 5 can be deformed when the thin film member 5 is brought into contact with the wall 2, the load applied to the airfoil model 11 is not substantially generated. Also, the thin film member 5 can be deformed along the outer circumference of the airfoil model 11. That is, it can be stuck (adhere) along the outer circumference. With those facts, even if the airfoil model 11 is moved during the wind tunnel test and the thin film member 5 is brought into contact with the wall 2 by some chance, the thin film member 5 is only deformed, which can extremely reduce the influence on the load that is applied to the airfoil model 11 being currently measured. That is, even if the air foil model 11 is displaced, the generation of the gap flow and the increase in the airfoil tip vortex can be prevented by surely blocking the gap without any influence on the airfoil load.

As the material of the above thin film member 5, an elastic material is preferable. As the elastic material, an elastically deformable resin is exemplified. A tape made of the elastically deformable resin is further preferable. As one example of a specific product, there is a protecting tape that has a width of 15 mm and a thickness of 0.5 mm and pertains to a silicon rubber film "KEIJU" made by MITSUBISHI PLASTICS, Inc. Such a material is preferable because there is a merit that the size is easily adjusted based on the dimension of the interval d1, it is easy to attach and detach the material to the airfoil model 11, and the airfoil model 11 is not damaged. Incidentally, the quantity (area) of the thin film member 5 is very small as compared with that of the airfoil model 11. Thus, its elastic force does not have influence on the load of the airfoil model 11.

Also, the thin film member 5 is arranged on the side of the airfoil model 11 and not on the side of the wall 2. This reason is as follows. That is, when the thin film member 5 is arranged on the side of the wall 2 and when the airfoil model 11 is moved, the gap is formed between the thin film member 5 fixed to the wall 2 and the end of the airfoil model 11. Thus, it is impossible to prevent: the generation of the gap flow in which the fluid moves from the side of the positive pressure surface to the side of the negative pressure surface in the airfoil model 11; and the increase in the blade tip vortex.

Figure 6:
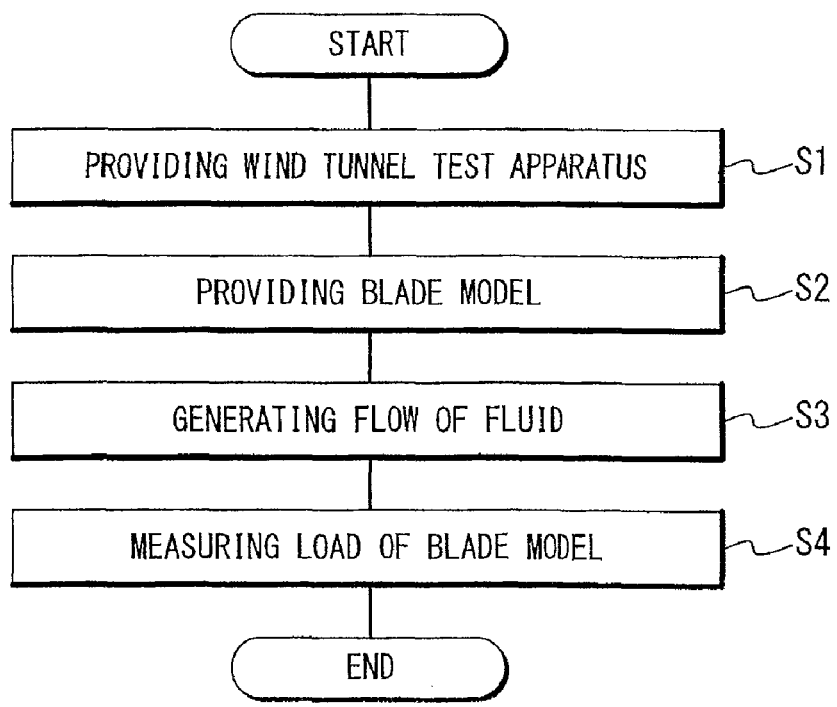
FIG. 6 is a flowchart showing a method of wind tunnel measurement of airfoil according to the embodiment of the present invention.

The method of the airfoil wind tunnel measurement according to the embodiment of the present invention will be described below with reference to FIGS. 3 to 6. Here, FIG. 6 is a flowchart showing the airfoil wind tunnel measurement method according to the embodiment of the present invention. At first, the wind tunnel test apparatus 1 is prepared as shown in FIG. 3 (Step S1). That is, the wind tunnel test apparatus 1 is prepared which includes: the two walls 2 configuring the wind tunnel flow path 6; the two supporting members 4 arranged to penetrate through the two walls 2, respectively, and not to interfere with the two walls 2; and the two load cells 3 holding the two supporting members 4, respectively.

Next, as shown in FIG. 3, both ends of the airfoil model 11 under test are fixed (connected) to the two supporting members 4, respectively. In succession, as shown in FIG. 5, the thin film members 5 are stuck (attached) onto both ends of the airfoil model 11 fixed to the support members 4 (Step S2). That is, one of the two supporting members 4 is coupled with one end of the airfoil model 11, and the other of the two supporting members 4 is coupled with the other end of the airfoil model 11. In succession, on each of both ends of the airfoil model 11, the thin film member 5 is stuck (adheres) so that apart of the thin film member 5 protrudes from the end of the airfoil model 11 along the outer circumference throughout the entire circumference. At that time, the thin film member 5 is stuck (adheres) onto the airfoil model 11 so that both of the distance between the upper wall 2 and the upper thin film member 5 and the distance between the lower wall 2 and the lower thin film member 5 become substantially zero. Since such an order is set, the sticking of the thin film member 5 can be easily adjusted, on the basis of the gap between the airfoil model 11 and the wall 2. Incidentally, the operation of sticking the thin film member 5 onto both the ends of the airfoil model 11 may be carried out before the airfoil model 11 is attached to the supporting members 4. In that case, the distance can be adjusted by using a method of, for example, re-sticking the thin film member 5, or cutting away the thin film member 5, or the like.

Figure 7:
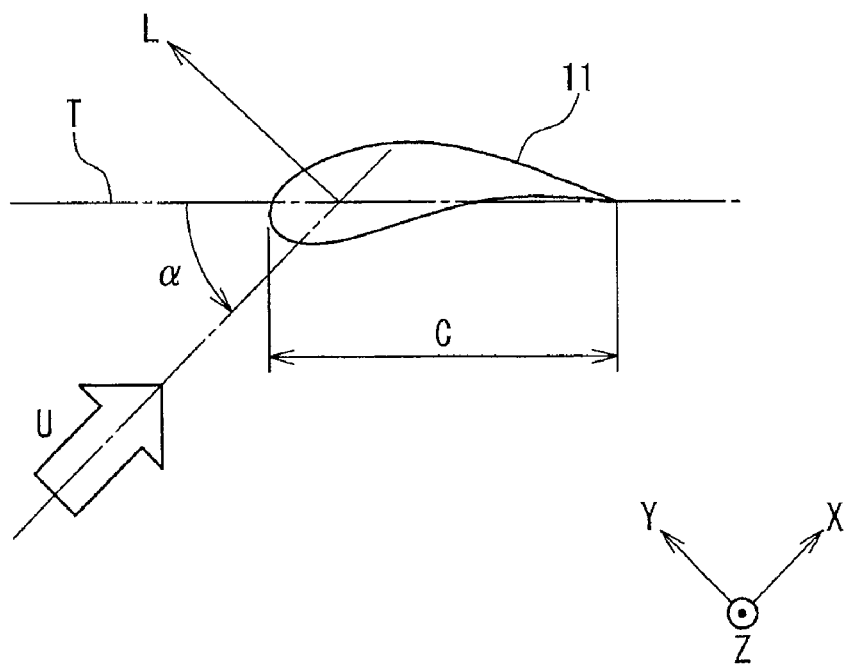
FIG. 7 is a schematic view showing a relation between a fluid and an airfoil model.

After that, in the wind tunnel flow path 6 configured by the two walls 2, the flow of the fluid is generated at the predetermined angle of attack and speed U (Step S3). That is, for the airfoil model 11 inside the wind tunnel flow path 6, the flow of the air is generated at the predetermined angle of attack and speed U. Then, the load (lift) applied to the airfoil model 11 is measured by using the two load cells 3 (Step S4). FIG. 7 is a schematic view showing a relation between the fluid of the speed U and the airfoil model 11. When the fluid (air) is supplied to the airfoil model 11 at the angle of attack $\alpha$ and the speed U, the lift L (airfoil load) is calculated by the following equation.

$$L(\alpha) = (1/2) \cdot \rho \cdot U^2 \cdot C \cdot C_1(\alpha)$$

Here, the lift $L(\alpha)$ is the airfoil load to be measured, the air density $\rho$ is known, the air speed U is the set value (measurement condition), the airfoil chord length C is known, and the angle of attack $\alpha$ is the set value (measurement condition). Thus, from the above measurement, it is possible to calculate the lift coefficient $C_1(\alpha_0)$ with respect to the predetermined angle of attack $\alpha_0$. Then, for the various directions (various angles of attack $\alpha$), the above steps S3 and S4 are carried out, which can determine the relation between the angles of attack $\alpha$ and the lift coefficients $C_1(\alpha)$.

Figure 8:
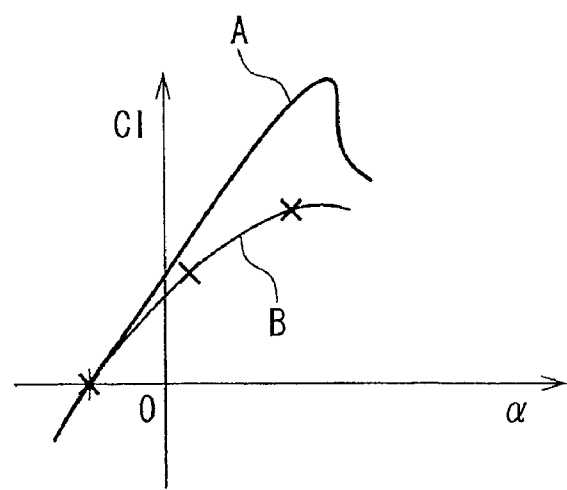
FIG. 8 is a graph showing one example of a relation between an angle of attack and a lift coefficient determined by a measurement.

FIG. 8 is a graph showing one example of the relation between the angle of attack $\alpha$ and the lift coefficient $C_1(\alpha)$ determined by the measurement. The lateral axis indicates the angle of attack $\alpha$, and the longitudinal axis indicates the lift coefficient $C_1(\alpha)$. In this figure, the curve "A" indicates the case that the airfoil wind tunnel measurement is carried out while the airfoil wind tunnel measurement apparatus and the airfoil model shown in FIGS. 3 to 5 are used. A curve "B" indicates the case that the airfoil wind tunnel measurement is carried out while the airfoil wind tunnel measurement apparatus and the airfoil model shown in FIG. 1 are used. In the case of the curve "B", the drops in the lift coefficient and the lift slope can be confirmed as compared with the curve "A". This is considered to result from the fact that the flow around the airfoil is three-dimensional. On the other hand, in the case of the curve "A", the recoveries of the lift coefficient and the lift slope can be confirmed as compared with the curve "B". That is, the relation between the angle of attack $\alpha$ and the lift coefficient $C_1(\alpha)$ is known to be linear. This is considered to result from the fact that the flow around the airfoil is two-dimensional. Thus, it is possible to get the aerodynamic characteristics of the two-dimensional airfoil section, such as the curve "A".

That is, the method of the airfoil wind tunnel measurement in this embodiment can extremely reduce (suppress): the generation of the gap flow in which the fluid moves from the side of the positive pressure surface to the side of the negative pressure surface in the airfoil model 11; and the increase in the airfoil tip vortex, because the gap d1 between the airfoil model 11 and the wall 2 is blocked with the thin film member 5. Thus, the flow of the fluid can be surely made two-dimensional. As a result, it is possible to properly obtain the aerodynamic characteristics of the two-dimensional airfoil section, which is intended in the airfoil wind tunnel measurement.

Also, even if the airfoil model 11 is displaced during the wind tunnel test and the thin film member 5 is brought into contact with the wall 2 by some chance, only the thin film member 5 is deformed. This leads to significant reduction of the displacement influence on the load applied to the airfoil model 11 that is being measured. That is, the generation of the gap flow and the increase in the airfoil tip vortex can be prevented without any influence on the airfoil load.

As the foregoing results, the method of the airfoil wind tunnel measurement in this embodiment enables the wind tunnel measurement that is intended to obtain the aerodynamic characteristics of the blade under the condition close to the actual use. Thus, it is possible to improve the aerodynamic design of the blade and the precision of the aerodynamic performance calculation.

It is apparent that the present invention is not limited to the above embodiment, but may be modified and changed without departing from the scope and spirit of the invention.

Although the present invention has been described above in connection with several exemplary embodiments thereof, it would be apparent to those skilled in the art that those exemplary embodiments are provided solely for illustrating the present invention, and should not be relied upon to construe the appended claims in a limiting sense.

What is claimed is:

1. A method of wind tunnel measurement of airfoil, comprising:
   providing a wind tunnel test apparatus, said wind tunnel test apparatus including:
   two walls configuring a wind tunnel flow path therebetween,
   two supporting members arranged to penetrate through said two walls, respectively, and not to interfere with said two walls, and
   two load measuring units holding said two supporting members, respectively;
   coupling both ends of an airfoil model under test with the two supporting members, respectively;
   generating a flow of a fluid in said wind tunnel flow path; and
   measuring a load applied to said airfoil model by using said two load measuring units,
   wherein a thin film member is stuck on each end of said airfoil model so that a part of said thin film member protrudes from said each end of said airfoil model along an outer circumference throughout an entire circumference,
   wherein said thin film member has a strength at which said thin film member enables to endure a pressure of said fluid, and is formed of a material which is elastically deformable, and
   wherein said thin film member is provided so that a gap between said each end of said airfoil model and one of said two walls facing to said each end of said airfoil model is blocked.

2. The method of an airfoil wind tunnel measurement according to claim 1, further comprising:
   sticking said thin film member onto said each end of said airfoil model so that said part of said thin film member protrudes from said each end of said airfoil model along said outer circumference throughout said entire circumference.

3. The method of an airfoil wind tunnel measurement according to claim 1, wherein said coupling step includes:
   adjusting said thin film member so that a distance between said thin film member stuck on said each end of said airfoil model and one of said two walls facing said thin film member becomes substantially zero.

4. The method of an airfoil wind tunnel measurement according to claim 3, wherein said thin film member includes a resin tape.

5. The method of an airfoil wind tunnel measurement according to claim 2, wherein said coupling step includes:
   adjusting said thin film member so that a distance between said thin film member stuck on said each end of said airfoil model and one of said two walls facing said thin film member becomes substantially zero.

6. The method of an airfoil wind tunnel measurement according to claim 5, wherein said thin film member includes a resin tape.

* * * * *